United States Patent [19]

Kauppi

[11] 4,208,286
[45] Jun. 17, 1980

[54] SULPHATE SOAP SKIMMING APPARATUS

[76] Inventor: Pekka K. Kauppi, P.O. Box 2137, Vancouver, B. C., Canada, V6B 3T8

[21] Appl. No.: 848,039

[22] Filed: Nov. 3, 1977

[51] Int. Cl.² .................... B01D 23/00; B01D 21/02
[52] U.S. Cl. ................................ 210/187; 210/528; 210/532 R
[58] Field of Search .............. 210/73 R, 84, 523, 525, 210/528, 531, 540, 534, 221, 187, 532 R; 252/367, 369, 371; 162/14, 16; 209/168, 169, 170, 493

[56] References Cited

U.S. PATENT DOCUMENTS

| | | | |
|---|---|---|---|
| 2,488,851 | 11/1949 | Copp | 210/528 |
| 2,593,036 | 4/1952 | Koch | 210/525 X |
| 2,874,842 | 2/1959 | Krafta | 210/540 |
| 3,102,094 | 8/1963 | Schmid et al. | 210/528 |
| 3,121,680 | 2/1964 | Ciabattari | 210/221 X |
| 3,224,964 | 12/1965 | Derenk et al. | 210/540 |
| 3,560,376 | 2/1971 | Heil | 210/525 |
| 3,880,704 | 4/1975 | Ziegler et al. | 162/16 |
| 3,947,355 | 3/1976 | Irwin | 210/528 |

Primary Examiner—Theodore A. Granger
Attorney, Agent, or Firm—Guy J. Houle; Alan Swabey; Robert Mitchell

[57] ABSTRACT

A separator vessel for separating and removing a substantial amount of an unwanted substance from a liquid wherein said substance has a specific gravity less than said liquid. The vessel comprises an enclosure having a bottom section and an inwardly tapering conical top section directly above the bottom section and having a top end area. Conduit means are provided in the enclosure to release the liquid in the bottom section thereof. Skimming means is secured at the top end area of the conical section for continuously discharging the unwanted substance as it rises to a predetermined level to the top end area. The unwanted substance is released through the conduit means and pumped to the storage means. Means is also provided to remove liquid from the bottom of the enclosure.

4 Claims, 5 Drawing Figures

SULPHATE SOAP SKIMMING APPARATUS

BACKGROUND OF THE INVENTION (a) Field of the Invention

The present invention relates to an improved separator vessel for separating and removing sulphate soap from black liquor obtained from a sulphate pulping process (b) Description of Prior Art A brief description of the state of the art relative to soap removal from black liquor in sulphate pulping process follows. Organic acids, such as resin acids and fatty acids are present in wood chips. Chips made out of pine wood, are found to contain more of the mentioned acids than other wood species. The alkaline conditions in the sulphate (kraft) pulping process convert these resin and fatty acids to their sodium salts which "salt out" from the black liquor (cooking liquor) separated from the pulp after cooking process. This material is called soap skimming which are separated from the top of the black liquor in a special vessel called skimming vessel. However, the soap separation in the skimming vessels is not complete. The soap still includes some black liquor.

The skimmings (with some included black liquor) are commonly known as the raw sulphate soap. The raw sulphate soap is, after separation of its remaining black liquor content, dissolved in sulphuric acid to form tall oil. The tall oil consists of approximately 40-50% of each fatty and resin acids with about 10% other acids. Tall oil yields are about 40-200 lb/ton of pulp. This material is not of much commercial utility until it is separated in two major component classes, fatty and resin acids by vacuum distillation. Fatty and resin acid fractions of 90-98% purity are obtainable. Refined tall oil is used to make detergents, resin glue, etc. for use of the industry.

The soap is usually separated from two places in the black liquor cycle of the sulphate pulping process. Firstly, from weak black liquor after liquor separation from pulp and before the liquor evaporation, and secondly, from strong black liquor between evaporator units and/or after completing the evaporation.

By increasing the black liquor concentration, the soap removal can be improved. The weak black liquor concentration is usually 11.0-17.0% of solids and the strong black liquor concentration is usually 50-65% of solids after evaporation. In systems where soap is skimmed between evaporator units at liquor concentration of 25-35%, an improved evaporator operation can be achieved. At this concentration, the soap removal is very effective and can be further improved by proper temperature and density control.

In the kraft pulping industry, several concepts are in use to design soap skimming vessels. However, these vessels have numerous problems such as that they require high initial capital cost, yield low quality soap, have low soap removal efficiency, and require high maintenance cost.

SUMMARY OF INVENTION

It is therefore a feature of the present invention to overcome the above-mentioned disadvantages of existing prior art devices and systems and to make the overall soap separation and removal more efficient and reliable.

A further feature of the present invention is to provide a separator vessel for efficient separating and removing sulphate soap from black liquor wherein proper selection of upward velocity of the black liquor in the soap separation zone and the liquor retention time in the vessel will keep the soap skimming vessel very compact, thereby reducing initial cost of the vessel.

A further feature of the present invention is to provide a separator vessel having a reduced diameter top to minimize the scraping surface and the size of the scrapers and also to increase the upward velocity of the separated soap thereby improving the soap removal from the vessel.

A further feature of the present invention is to provide a vessel utilizing multiple scrapers in large tanks whereby to reduce down time of the skimming vessel due to breakdown of the scraping mechanism. Further, multiple scrapers will remove soap more efficiently from the skimming vessel surface since they can be operated at a higher speed, when necessary. This is not practical with larger scrapers.

A further feature of the present invention is to provide a soap discharge arrangement in the vessel wherein the separated soap will remain heated by the black liquor to improve the pumping of soap out of the skimming vessel.

According to the above features, from a broad aspect, the present invention provides a separator vessel for separating and removing a substantial amount of an unwanted substance from a liquid wherein said substance has a specific gravity less than said liquid. The vessel comprises an enclosure having a bottom section and an inwardly tapering conical top section directly above the bottom section and having a top end area. Conduit means are provided in the enclosure to release the liquid in the bottom section thereof. Skimming means is secured at the top end area of the conical section for continuously discharging the unwanted substance as it rises to a predetermined level to the top end area. Means is also provided to remove liquid from the bottom of the enclosure.

BRIEF DESCRIPTION OF DRAWINGS

A preferred embodiment of the present invention will now be described with reference to the accompanying drawings in which.

DESCRIPTION OF PREFERRED EMBODIMENTS

Figures 1A, 1B:
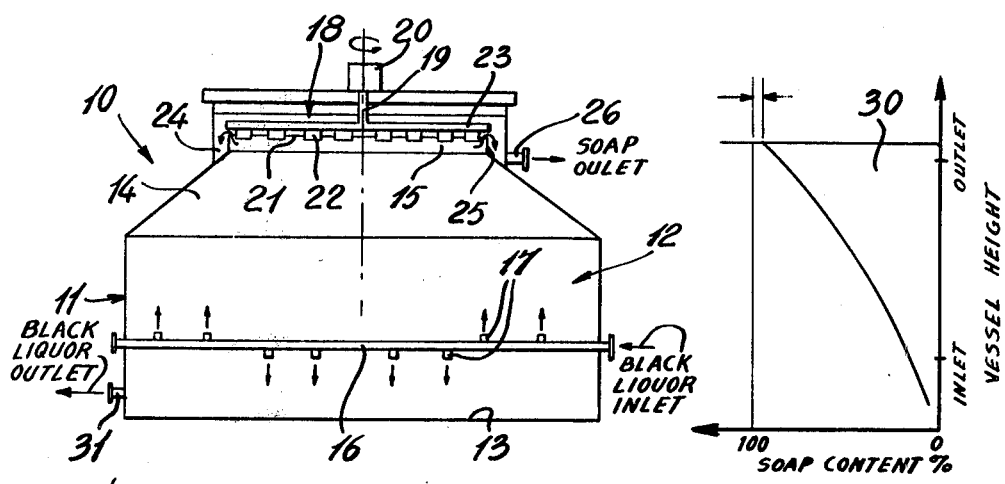
FIG. 1a is a sectional side view of the separator vessel of the present invention.
FIG. 1b is a characteristic curve of the ratio of soap to black liquor concentration at different levels within the vessel.

Referring now to the drawings, and more particularly to FIGS. 1a and 1b, there is shown generally at 10, the separator vessel of the present invention. The vessel comprises an enclosure 11 having a bottom section 12 which is a generally cylindrical section having a bottom wall 13. An inwardly tapering conical top section 14 is positioned above the bottom cylindrical section 11 and defines a top end area 15 where sulphate soap is removed.

A conduit 16 extends through the bottom section 12 and releases the black liquor liquid in the bottom section through nozzles 17. The black liquor is pumped into the lower middle section of the bottom section 12 at a low velocity so that the separated soap in the vessel is not disturbed. The upward velocity of the black liquor in the vessel is determined on the basis of the tall oil content of the black liquor solids. This liquor velocity is used to calculate the diameter of the vessel. The height of the vessel is based on the quality of soap desired. When proper upward velocity and the retention time is proper, the soap will separate and float on the surface of the liquor level, and yields high quality soap.

Skimming means herein comprised of a single rotating scraper 18 mounted on a driven axle 19 driven by a motor 20, is secured at the top end area 15 for continuously discharging the soap as it rises to a predetermined level 21 at the said top end area.

As hereinshown, the scraper 18 is provided with scraper blades 22 disposed at a proper angle whereby to direct the soap towards the outer periphery of the turret frame 23. A collecting compartment 24 surrounds the top end edge 25 of the enclosure 11 whereby the soap will be discharged into the collecting compartment by the scraper blades 22. A convection pipe 26 will transport the soap from the collecting compartment to a soap storage area (not shown). This transportation can be made by such means as a gear pump (not shown) mounted into the pipe 26.

The conical section 14 of the enclosure effectively reduces the diameter of the top end area 15 relative to the diameter of the bottom section 12 of the enclosure whereby to give a better control of the scraping operation than containers being cylindrical throughout their height. Also, the scrapers are vertically adjustable whereby to obtain optimum operation thereof.

Referring to characteristics shown in FIG. 1b, it can be seen that the scrapers are located at an area 30 where the concentration of soap is greatest. This is due to the fact that the specific gravity of the soap is much less than that of the black liquor. Therefore, preferably, the soap should be skimmed from the top surface of the black liquor and the black liquor should be removed from the bottom of the container where there is less soap concentration. As shown in FIG. 1a, the liquor is pumped from the outlet 31 at the bottom of the section 12.

Figure 2:
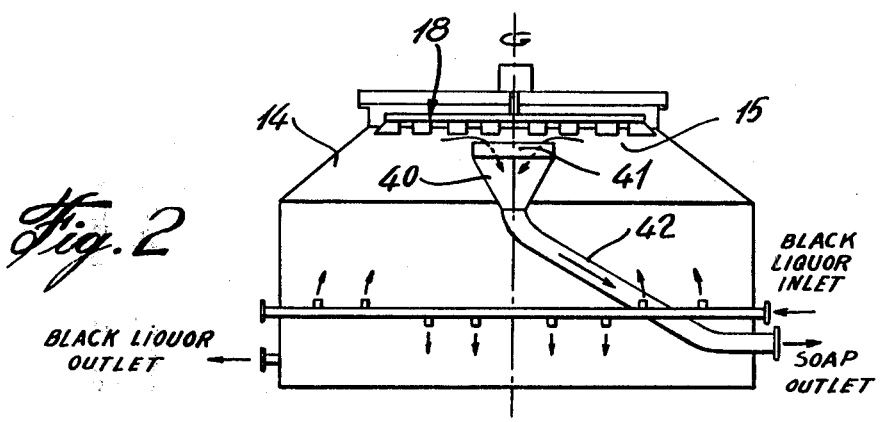
FIG. 2 is a section view of the separator vessel showing a modification of the discharge collector vessel.

Referring now to FIG. 2, there is shown a further modification of the discharge means. Hereinshown, the discharge means is a collector vessel 40 secured centrally of the top end area 15 and having an open top lying at the predetermined level whereby the scraper 18 will guide the soap centrally of the top end area 15 and into the opening 41 of the collector vessel 40. A pipe 42 extends from the bottom of the collector 40 to convect the removed soap out of the enclosure 11. It can be seen that the pipe 42 extends within the enclosure 11 through the black liquor whereby the heat from the black liquor will maintain the pipe heated to improve the convection of soap discharged from the collector vessel 40.

Figure 3:
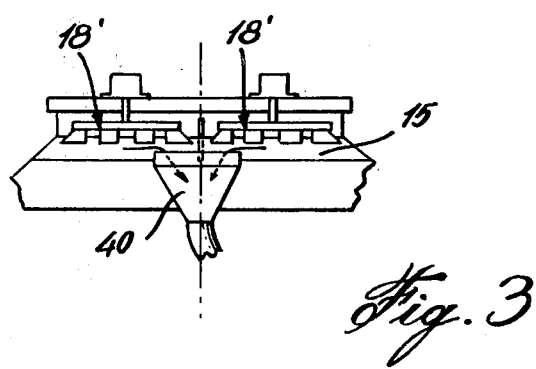
FIG. 3 is a fragmented sectional view showing a modification of the skimming scrapers.

Referring now to FIG. 3, there is shown a further modification wherein two or more rotating scrapers 18' and 18" are secured at the top end area 15. Preferably, with a cylindrical opening at the top of the conical top section, three such rotating scrapers 18' are secured each lying on an axis 120° apart. Each rotating scraper is of the same construction as the single one and operated in the same manner with the exception that they are much smaller in diameter, therefore permitting easy maintenance and replacement of such scraper without shutting down the operation of the separator vessel. Also, the use of smaller scrapers permits their operation at higher speed to more effectively discharge the soap.

Black liquor is usually hot (70° C.–85° C.) but not heated for soap separation purposes when it enters the vessel. Briefly, the separator vessel of the present invention provides an improved method of separating and removing sulphate soap from black liquor and consists basically of the steps of discharging black liquor in the bottom of an enclosure; at a predetermined upward velocity of the black liquor in the enclosure to minimize liquor retention time in the enclosure; skimming sulphate soap from a top end area of the enclosure at a predetermined level to continuously discharge a sulphate soap, and removing soap free the black liquor from the bottom of said enclosure.

Figure 4:
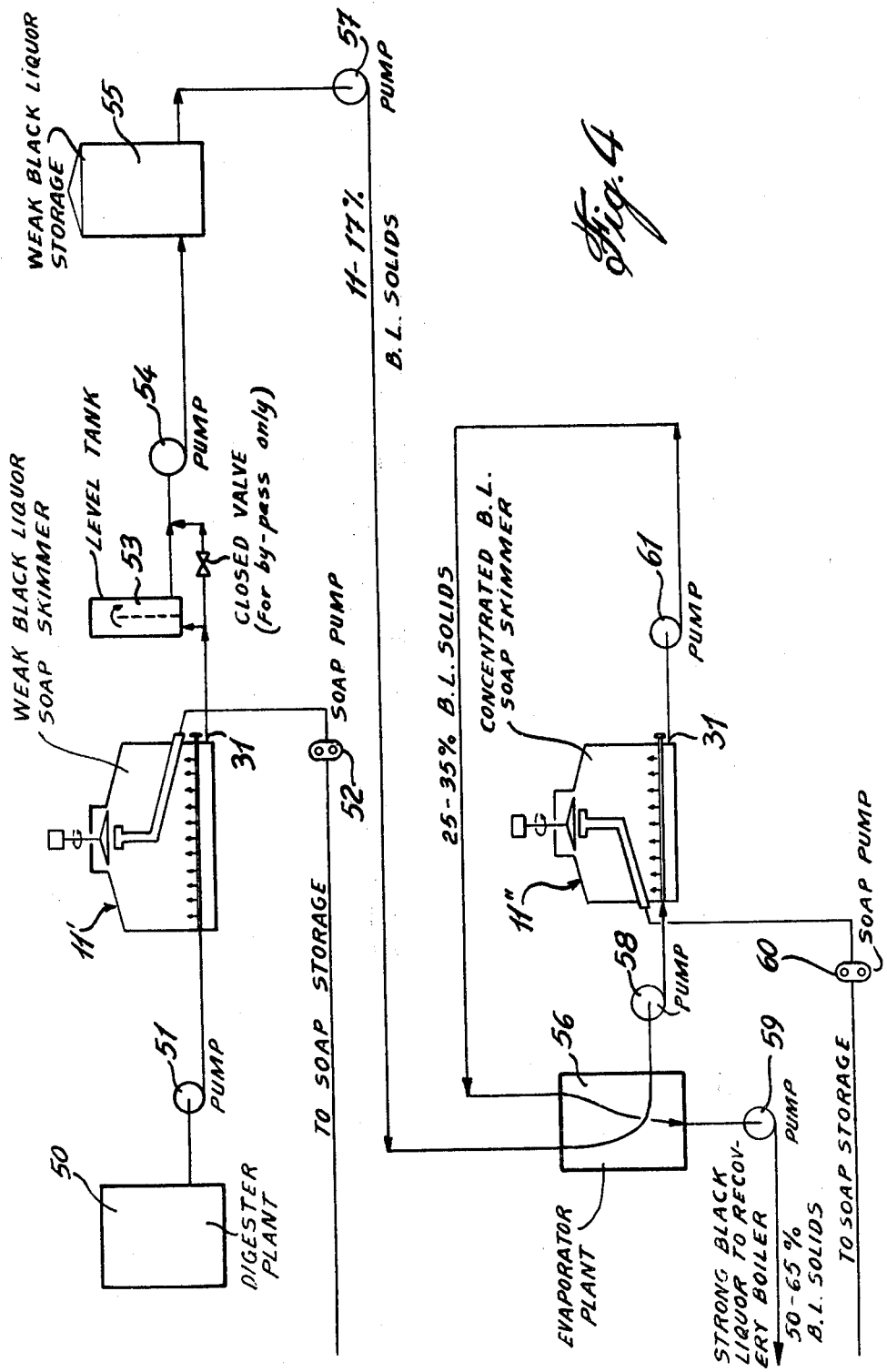
FIG. 4 is a schematic illustration of a typical soap skimming system utilizing the separator vessels of the present invention.

Referring to FIG. 4, there is shown a schematic diagram of a soap separation system utilizing the vessels 11 of the present invention and wherein the soap is removed at two stages to provide weak and strong black liquor. As shown, the black liquor from a digester plant 50 is fed by a pump 51 to a first vessel 11' of the present invention where soap separation takes place. The soap separated is then fed to a soap storage via the soap pump 52. The weak black liquor taken from the outlet 31 at the bottom of the vessel 11 is then fed to a level tank 53 where it is then pumped via pump 54 to a storage tank 55. The weak black liquor in the storage tank 55 is then fed to an evaporator plant 56 for concentration by means of a pump 57.

A further vessel 11" of the present invention is then fed with the evaporator plant concentrated liquor pump 58. The separator 11" further removes soap from the black liquor and feeds it via pump 60 to the soap storage tank (not shown). The concentrated black liquor at the outlet 31 of the separator 11" is fed back into the evaporator plant 56 for further concentration, via pump 61. The strong black liquor from the evaporator plant is pumped to a recovery boiler via pump 59.

The soap skimming vessel of the present invention is low in height since the vessel is being used for soap separation and removal only. Existing soap skimming vessels are used also as storage tanks and this is not good for soap separation. It is preferred to maintain a constant level operation for soap separation. Also, when the vessel is used for strong black liquor soap skimming, the black liquor temperature and density can be critical. Sometimes, it is necessary to have a temperature and density control of black liquor. Temperature control can be obtained by installing a steam coil at the bottom of the skimming vessel. Density control can be obtained by black liquor recirculation. This improves the soap separation and makes the soap removal and pumping easier. Further, although not disclosed, it is possible to combine both of the collecting compartments 24 and 40, as shown in FIGS. 1a and 2, whereby soap removal can be achieved from both the center and outside compartments of the enclosure. This would require a modified scraper design. Other obvious modifications of the present invention are possible and are intended to be covered by this specification providing they fall within the ambit of the broadest claim as appended hereto.

I claim:

1. A separator vessel for separating and removing a substantial amount of sulphate soap from heated black liquor obtained from a sulphate pulping process, said sulphate soap having a specific gravity less than said liquor, said vessel comprising an enclosure having a bottom section, a tapering conical top section directly above said bottom section and tapering inwardly towards a top end soap discharge area, said top section tapering inwardly from said bottom section toward said top end to define a cross-section area decreasingly smaller than the cross-section area of said bottom section to cause an increase in velocity of said soap as it rises in said top section toward said discharge area, conduit means in said enclosure to release said liquid in said bottom section at a low velocity, at least two rotating scrapers secured at said top end soap discharge area of said conical section and rotatable therein for continuously skimming and discharging said sulphate soap in a collector vessel as said soap rises to a predetermined level in said top end area, said collector vessel being secured centrally of said top end area and having an open top lying at said predetermined level whereby said two or more scrapers will discharge soap therein as it rises to said predetermined level, a pipe to transport said soap from said collector vessel, said pipe extending through said enclosure and in contact with said heated liquid whereby said pipe will remain hot to improve the convection of soap discharged into said collector vessel, and an outlet spaced below said conduit means to remove liquor from the bottom of said enclosure as said substantial amount of sulphate soap rises toward said top end area.

2. A separator vessel as claimed in claim 1, wherein said bottom section is a cylindrical section merging into said conical section, said conical section having an open top end, and support means at said top end to secure said one or more rotating scrapers.

3. A separator vessel as claimd in claim 2, wherein each said scraper has a turret comprising a plurality of scraper blades, a central drive shaft associated with each turret and drive means to impart a rotational drive to said drive shaft.

4. A separator vessel as claimed in claim 1, wherein said conduit means comprises a discharge pipe extending within said bottom section and having spaced apart nozzles for discharging said liquid in said enclosure under pressure to impart an upward velocity to liquid in said enclosure whereby separated soap will rise quickly.

* * * * *